United States Patent [19]

Lenters

[11] Patent Number: 5,217,724
[45] Date of Patent: Jun. 8, 1993

[54] APPARATUS FOR THE IN-LINE CROPPING AND/OR CHAMFERING OF A PLASTIC TUBE

[75] Inventor: Egbert Lenters, Hardenberg, Netherlands

[73] Assignee: Wavin B.V., Netherlands

[21] Appl. No.: 851,249

[22] Filed: Mar. 13, 1992

Related U.S. Application Data

[63] Continuation of Ser. No. 605,403, Oct. 30, 1990, abandoned.

[30] Foreign Application Priority Data

Nov. 1, 1989 [NL] Netherlands ............. 8902702

[51] Int. Cl.⁵ .................. B29C 57/00; B23D 21/04
[52] U.S. Cl. ............................. 425/142; 82/61;
 82/64; 264/163; 425/212; 425/296; 425/307
[58] Field of Search ............. 264/150, 151, 159, 163;
 425/142, 212, 289, 296, 306, 307, 308, 315;
 82/59, 61, 64, 72

[56] References Cited

U.S. PATENT DOCUMENTS

| | | | |
|---|---|---|---|
| 4,112,794 | 9/1978 | Franks et al. | 82/64 |
| 4,112,795 | 9/1978 | de Putter | 425/445 |
| 4,698,196 | 10/1987 | Fabian | 425/296 |

FOREIGN PATENT DOCUMENTS

| | | |
|---|---|---|
| 153584 | 10/1951 | Australia . |
| 957708 | 1/1957 | Fed. Rep. of Germany . |
| 480056 | 6/1916 | France . |
| 2141518 | 1/1973 | France . |
| 299898 | 8/1965 | Netherlands . |
| 7705659 | 7/1978 | Netherlands . |
| 8602737 | 5/1988 | Netherlands . |
| 570840 | 12/1975 | Switzerland . |
| 1594665 | 8/1981 | United Kingdom . |

Primary Examiner—Jay H. Woo
Assistant Examiner—James P. Mackey
Attorney, Agent, or Firm—Wigman & Cohen

[57] ABSTRACT

An apparatus for in-line cropping and/or chamfering of a plastic tube. The apparatus includes pressure rollers for deforming a tube section and cutting devices to perform the cropping and/or chamfering operation. The control of movement of the pressure rollers and cutting devices is carried out by a combination of a face cam and a rotor disc; the face cam and rotor disc have the same diameter and may be given rotary speeds which are related to each other in any desired way. Control is carried out preferably by use of an interference box.

6 Claims, 6 Drawing Sheets

5,217,724

APPARATUS FOR THE IN-LINE CROPPING AND/OR CHAMFERING OF A PLASTIC TUBE

This is a continuation of co-pending application Ser. No. 07/605,403 filed on Oct. 30, 1990, now abandoned.

BACKGROUND OF THE INVENTION

The invention relates to an apparatus for the in-line cropping and/or chamfering, using one or more cutting devices, of a plastic tube moulded by extrusion, which apparatus is suitable for siting in an extrusion line for the continuous moulding of such a plastic tube, comprising means for positioning a tube section with respect to a cutting device or the cutting devices and at least comprising per cutting device two deforming rollers for deforming the tube section on which the cropping and/or chamfering operation has to be carried out, the apparatus comprising moreover a rotatably arranged combination of a face cam having a groove composed of a plurality of levels and a rotor disc for controlling the movement of the deforming rollers and the cutting device or the cutting devices in carrying out the cropping and/or chamfering operation.

Such an apparatus is known from the laid-open Dutch Patent Application 7705659 of the Applicant.

The rotor disc mentioned above in the preamble is a disc having a number, for example four, of oscillating pieces each having a composite cam-follower roller. The movement of the cam-follower rollers of the composite cam-follower roller in the respective grooves of the face cam controls the radial movement of the deforming rollers and the cutting devices.

In the above application three pairs of deforming rollers and three cutters, which are all symmetrically positioned around the tube, are shown. A cutter has, in axial direction of a tube, one deforming roll on either side.

In such an apparatus, a continuously moulded plastic tube is divided into pieces as required by using one or more cropping tools, while a suitable chamfering is obtained by using one or more chamfering tools.

To obtain a reproducible cropping and chamfering result, the tube is positioned, prior to such an operation, with respect to the combination of tools, which will hereinafter be termed in its totality as cutting devices, after which the tube is deformed with the aid of deforming rollers in order to provide the tube with a rigidity such that it will no longer deform when acted on by the cutting devices. The apparatus for carrying out the cutting operation moves while carrying out the operation at the same axial speed as that with which the tube is moulded.

The movement of the deforming rollers on either side of a cutting device and the cutting devices is controlled by means of a combination of a face cam and a rotor disc, the face cam comprising a groove which is subdivided into two levels. One level regulates, by means of a first cam-follower roller, the movement of the deforming rollers towards the surface of the tube and the degree of deformation of the tube, while the groove in the second level provides, by means of a second cam-follower roller, for the movement of a cutting device.

The groove is composed in its generality of a number of identical sections adjoining one another, each of the identical sections providing the possibility of causing the deforming rollers and the cutting devices to carry out a complete movement and operation cycle.

To cause the first and second cam-follower rollers on the rotor disc to move in the composite groove of the face cam, use is made, in the apparatus described above, of a difference in circumference of the two discs.

By making the circumference of the two discs different, a difference in rotary speed of the two discs will be obtained when the two discs are driven by the same motor, as a result of which the cam-follower roller will move in the groove with respect to an initial position. Because all cam-follower rollers pass through one of the groove sections completely, the deforming rollers and the cutting devices return to their initial position, at which moment a coupling between the pulleys thereof is released and the device is moved back in axial direction to its starting position. A new operation cycle is then carried out upon the next energizing of the coupling which couples the drive-pulley of the face cam to that of the rotor disc.

A known device of this type has the disadvantage that, as a result of the constant difference in rotary speed which occurs between the rotor disc and the face cam as a consequence of their fixed difference in diameter, the movement of the deforming rollers and the movement of the cutting devices will always take place at one and the same speed and over the same distance.

If, therefore, at the one hand tubes having small diameter and large wall thickness have to be cut, the movement of the cutting device will take up a disproportionately long period of time, as a result of which the bed of the cropping and/or chamfering apparatus will have to be disproportionately long and requires unnecessary much energy.

At the other hand, upon cutting of tubes having a large diameter and a small wall thickness, the cutter will pierce the wall with too high speed which results in high forces.

SUMMARY OF THE INVENTION

It has now been found that an attractive alternative to such disadvantages is offered if, according to the invention, the rotor disc and the face cam in the apparatus described above are given the same circumferential dimension and means for influencing the rotary speed are provided for matching the rotary speed of the rotor disc and the face cam to each other as required.

In particular, as a result of being able to adjust the rotary speeds of the rotor disc and the face cam with respect to each other as required, a great degree of freedom can be obtained in choosing diverse speeds of movement and operation for carrying out the diverse movements and operations.

Although there are several possibilities for matching the rotary speeds of the rotor disc and the face cam with respect to each other, a good possibility is provided, in particular, in that, in the apparatus according to the invention, the means for influencing the rotary speed are composed of a rotary speed interference box, the latter acting on the rotary speed of the face cam. Such a rotary speed interference box is generally known and is essentially a planetary gear box in which an outer ring is present which can be rotated by a worm drive. The gear box is sited between an input shaft and an output shaft; depending on the direction of rotation of the outermost ring of the box, the rotary speed of such an output shaft can be increased or decreased with equal rotary speed of the input shaft. By using such a rotary speed interference box between the two discs in this case, the rotary speed of one of the discs can be adjusted with respect to the other disc as required, as a result of which a movement of the cam-follower roller in the groove starting from an initial position becomes possible.

Thus, in the case of a face cam with a continuous groove a rapid movement by the cam-follower roller in the groove will be possible until the deforming rollers are in contact with the outer surface of the tube, after which, depending on the thickness to be cut through, a suitable depth of indentation by the rollers and a suitable deforming speed can be chosen for the operation of the cutting device or the cutting devices.

As a result of using a rotary speed interference box, it becomes possible, in principle, to provide the disc on which the interference box acts with any desired rotary speed. Starting from an equal rotation speed of the two discs, the disc whose rotary speed is influenced can be given a higher or lower rotary speed.

This means that, for example, if the rotary speed of the face cam is increased, a movement of the cam-follower rollers in one direction from the initial position to the position of contact of the deforming rollers and the operation of one or more cutting devices can be achieved, followed by a resetting of the cutting devices and deforming rollers in the initial position by moving the cam-follower rollers in the same direction; however, after completion of the operation of the cutting devices, a return of the cam to the initial position can be obtained by making the rotary speed of the face cam lower than the rotary speed of the rotor disc. As a consequence of this last possibility, in a very expedient embodiment of the apparatus according to the invention, the face cam can be so constructed that it comprises a groove which is subdivided into a number of identical separate segments. The composite cam-follower roller running in one segment of the groove can move in the groove, as a result of accelerating the face cam, from a starting position and bring the deforming rollers into pressure contact with the tube surface, after which the cutting devices are able to come into operation. When the operation has been completed, the cam-follower roller can then return in the same groove segment to the initial position by suitably reducing the rotary speed of the face cam.

Of course, in this case too, the rotary speed of the rotor disc can, if required, be fixed while the rotary speed interference box is caused to act on the rotary speed of the face cam.

In all cases, the rotary speed of one of the discs can be influenced as required, with the result that the speed of movement of the deforming rollers and the speed of movement of the cutting devices during the operation can be suitably chosen as required. With a groove divided into identical segments, the number of identical segments is equal to the number of cutting devices which the apparatus comprises.

In an apparatus according to the invention which is set up in a continuously operating extrusion line, it is of importance to ensure, in the event of unintended stoppage of the line or dropout of, for example, the main drive motor of the apparatus, that no damage to the cutting devices can occur. With that object, there is incorporated in the apparatus a reset device which, in the event of stoppage of the extrusion line or a section thereof, provides for the return, at least prior to restarting the extrusion line, of each cutting device and the deforming rollers operating together therewith to the initial position. Other devices of the apparatus such as, for example, the positioning means can also be returned to their initial position by the operation of said reset device.

The invention also relates to a method for the cropping and/or chamfering of a plastic tube continuously moulded by extrusion using an apparatus according to the invention as described above which is characterized in that, to regulate the chip length during the cropping and/or chamfering operating, the total time necessary for this operation is divided into a number of parts with intervening periods in which the cutting device is kept at the same depth or is even slightly retracted, but the deforming rollers remain in contact with the tube surface with maintenance of the same deformation.

The laid-open Patent Application 86 02 737 of the Applicant disclosed an apparatus of the type to which the invention relates and in which, in particular, means are present for removing the chip material released during cropping and/or chamfering.

Now if tubes of large diameter and/or large wall thickness or other material are processed, it may occur that the chip material released has such a large length that problems may occur for a satisfactory operation of the apparatus.

As a result of the construction of the apparatus according to the invention, it is now possible, however, to divide the total time needed for the cropping and/or chamfering operation into a number of parts, there being present between the parts periods in which the cutting device or the cutting devices are inoperative such that much chips of short length are produced and in which provision is made for the removal of a stream of short chips.

BRIEF DESCRIPTION OF THE DRAWINGS

The invention will now be illustrated with the aid of the drawing, in which.

DESCRIPTION OF THE PREFERRED EMBODIMENT

Figure 1:
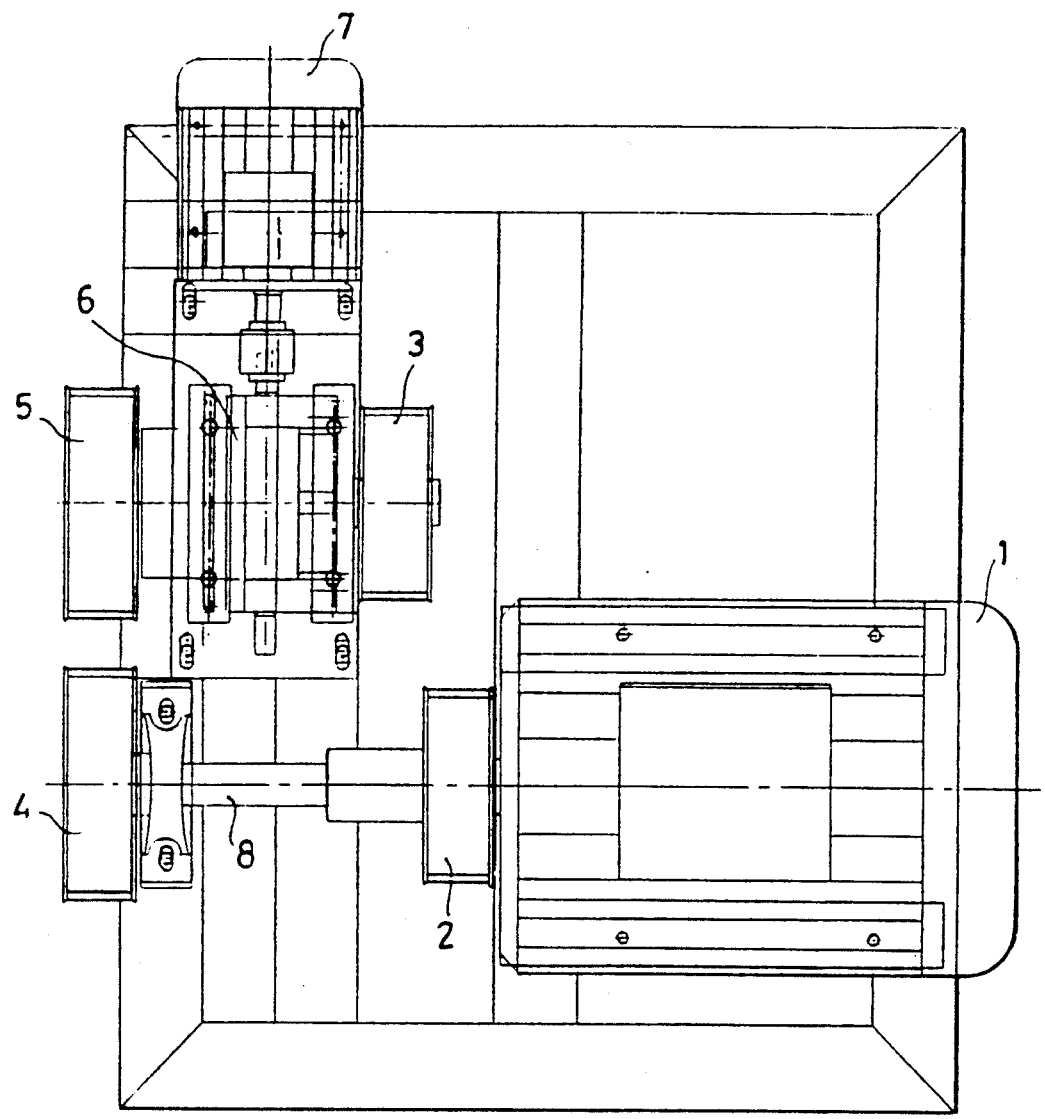
FIG. 1 shows a plan view of the main drive of the apparatus with a rotary speed interference box coupled on, FIG. 2 shows a view of the way in which the rotor disc and the face cam are driven.

In FIG. 1, the main motor of the cropping and chamfering apparatus according to the invention having a pulley 2 is indicated by 1. The pulley 2 may, for example, serve to drive the rotor disc. Mounted on a continuous shaft 8 is a pulley 4 which can be coupled 1:1 to a pulley 5. A rotary speed interference box 6 having a worm wheel drive 7 is mounted between the pulley 5 on the input shaft and the pulley 3 on the output shaft. If the drive 7 is not operated, the pulleys 2 and 3, which have the same outside diameter, have the same rotary speed and the face cam and the rotor disc will therefore have the same circumferential speed since the outside circumferences of the two discs are equal.

If the motor 7 is energized, however, depending on the manner of energization, a rotary speed can be given to the pulley 3 which may be higher or lower than the rotary speed of the pulley 2. As a result of influencing the rotary speed of the pulley 3, the speed, the extent and time duration of movement of a composite cam-follower roller in the groove of the face cam are influenced and adjusted as required.

Figure 2:
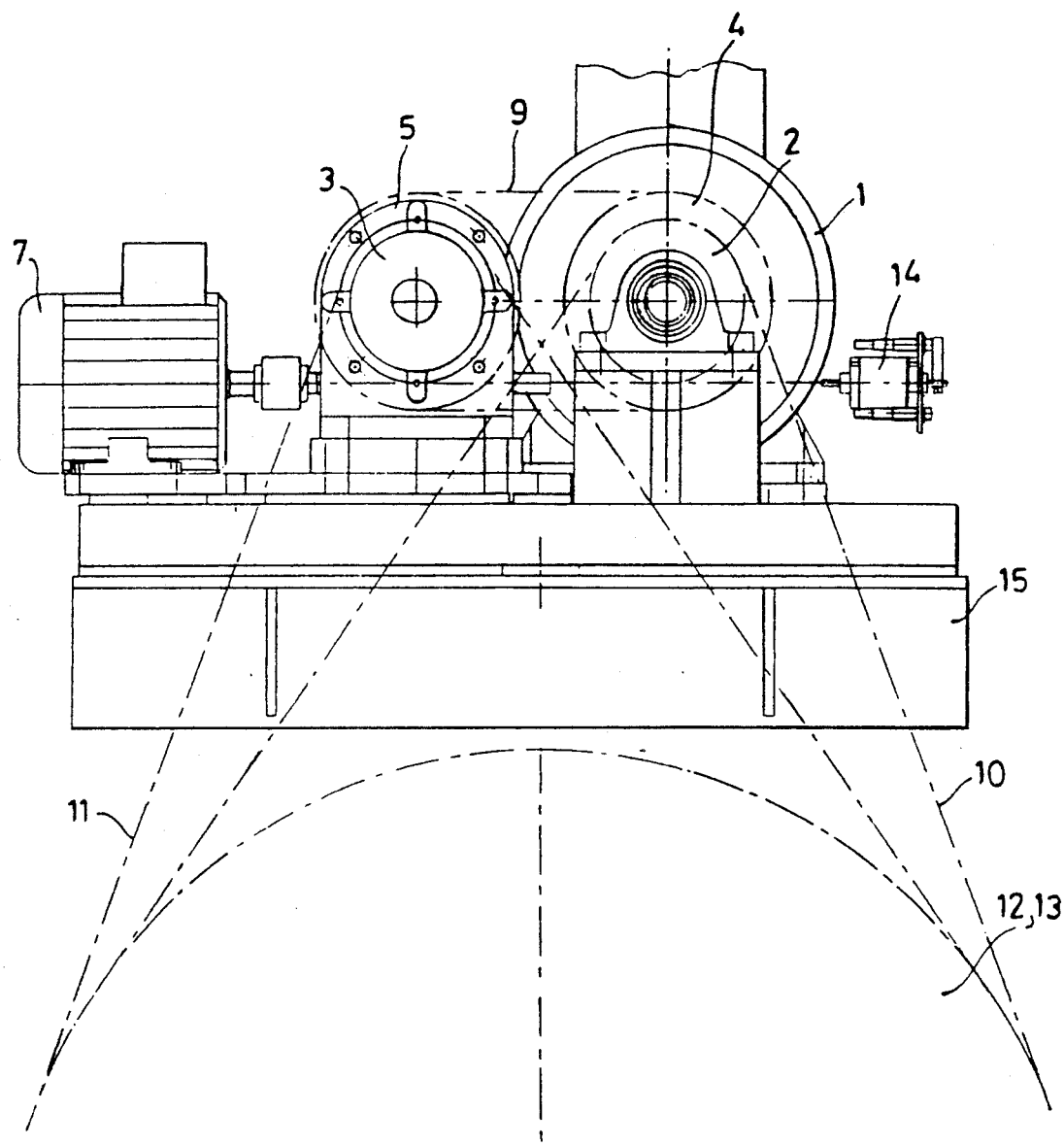

In FIG. 2, the same components as in FIG. 1 are indicated by the same reference numerals; it can be seen that the pulley 4 and the pulley 5 have an identical diameter and that both pulleys are coupled by means of a toothed belt 9. The pulleys 2 and 3 also shown provide for driving the rotor disc or face cam (12; 13) respectively with the aid of toothed belts 10 and 11.

15 indicates the frame on which, on the one hand, the rotor disc and face cam drive is sited while, on the other hand, the face cam and the rotor disc are indicated in their position with respect to said frame, the parts bearing the face cam and the rotor disc having been omitted for clarity.

In FIG. 2, 14 indicates a reset device that acts on the worm wheel of the rotary speed interference box in the event of, for example, power failure, as a result of which the extrusion line drops out. On restarting the line, the reset device will first provide for the apparatus to be returned again to the initial position; that is to say, the deforming rollers and positioning means are released from the tube and returned to their initial position; the same is true of the cutting devices which are returned together with the deforming rollers.

The reset device will also function if a part of the line drops out. If, for example, the main motor 1 drops out thermally, there will continue to be voltage on the reset device 14. Said reset device 14 then provides directly for the return of the components of the cropping and chamfering apparatus to the initial position.

Figure 3:
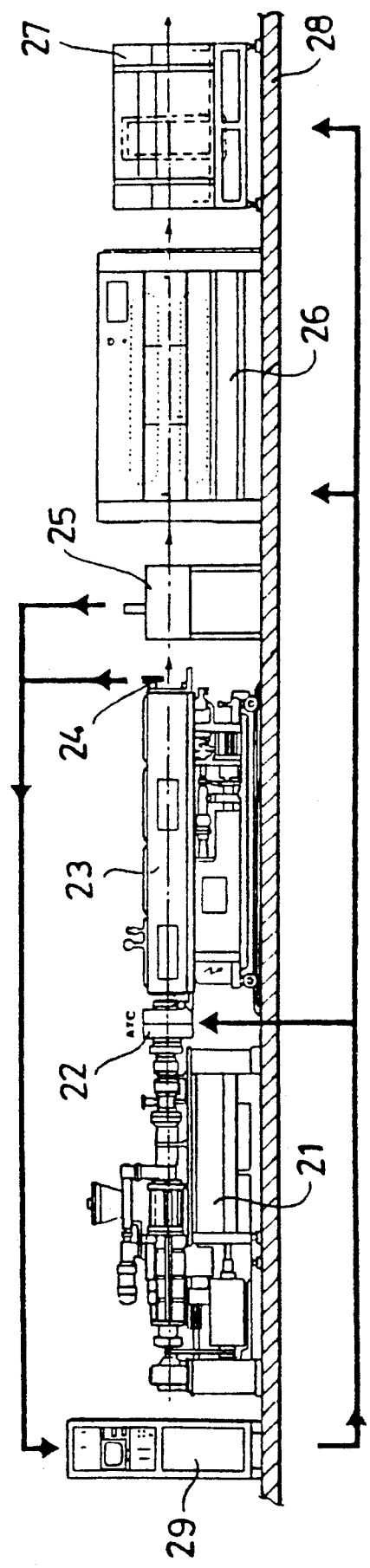
FIG. 3 shows a diagrammatic view of an extrusion line in which an apparatus according to the invention is incorporated.

FIG. 3 shows diagrammatically an extrusion line in which the extruder is indicated by 21, the extrusion head by 22, a sizing apparatus and cooling installation by 23, a pulse wheel by 24, a wall thickness measuring apparatus by 25, a drawing machine by 26 and a cropping and chamfering apparatus by 27. The entire installation is sited on solid ground 28; the installation is controlled with the aid of a microprocessor or, in general, logic computing unit 29 which controls and regulates the operation of the apparatus on the basis of the program fed-in and the data which are obtained from the pulse-forming apparatus 24 and the wall thickness measuring apparatus 25.

The cropping and chamfering apparatus incorporated in the line is provided with its own control which, if desired, can be coupled to the unit 29 in order to work together with it.

Figure 4:
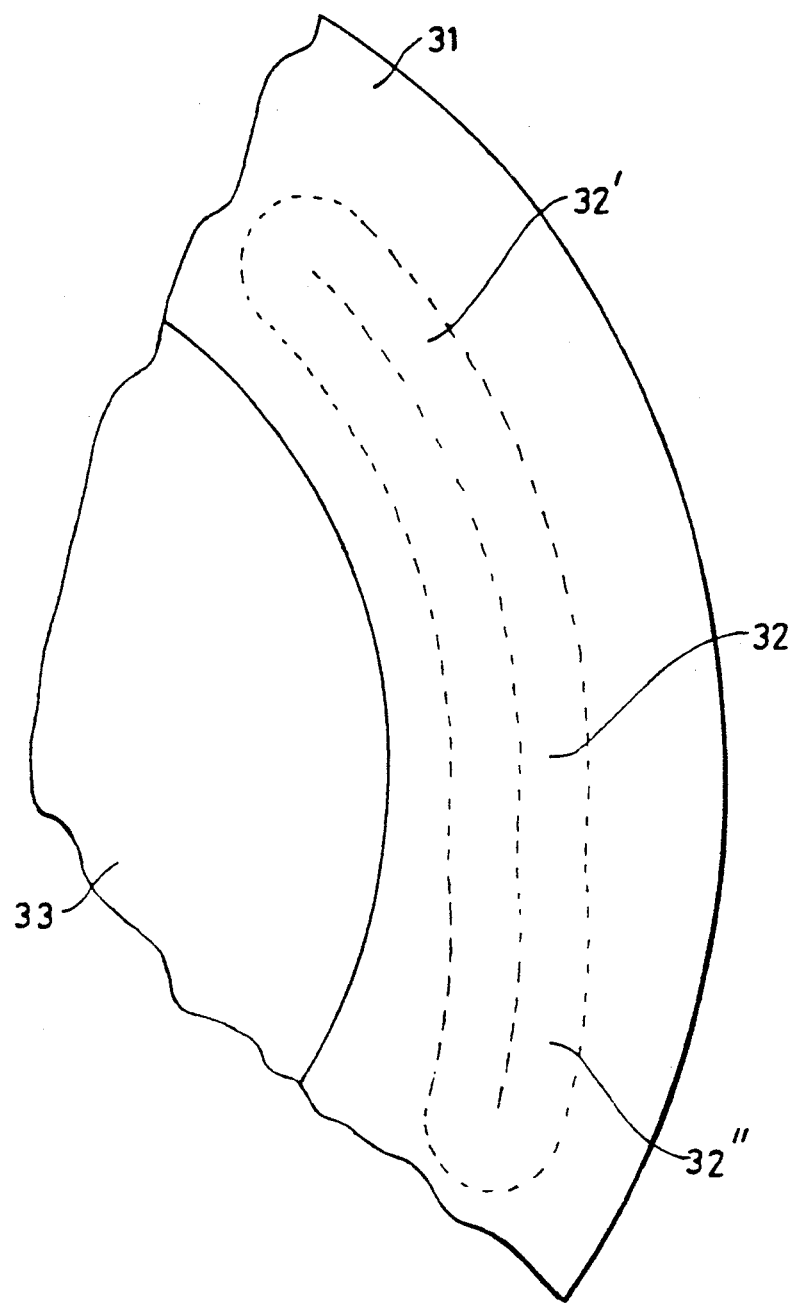
FIG. 4 shows a part of the surface of a face cam with a groove segment present therein.

FIG. 4 diagrammatically shows in plan view a part of a face cam 31 having grooves 32 which each are divided into two different parts 32' and 32", while inside the grooves 32 grooves are present having a lower level (not shown). The grooves 32 serve for the control of movement of the deforming rollers and the grooves at a lower level serve for the control of movement of the cutting devices.

It is furthermore pointed out that in the initial state, the cam-follower roller for the production of thin-walled tubes will, for example, be in the groove shown at the beginning of the section 32". If, however, a tube wall having relative great wall thickness is produced a smaller indentation will be desired and the initial state will be spaced from said beginning of section 32". The situation may, however, also be such that a groove is divided into two symmetrical parts situated on either side of a central line, the heart line of the cam-follower roller coinciding in the initial state with the above-mentioned central line. When the face cam is rotated in respect to the rotor disc in one direction, one certain type of tool may then, for example, be energized while rotation of the face cam in respect to the rotor disc in the other direction will result in an operation of another type of tool. The grooves 32 are in this situation symmetrical, the lower grooves (not shown) are slightly different on either side of the central line. Through these differences upon rotation in one direction a set of cutters starts operating (the lower groove for the other cutters keeps, upon rotation in said direction, said cutters in the initial position). Upon rotation in the opposite direction the other cutters start operating, dictated by the lower groove. The first mentioned set of cutters will then be kept by the corresponding part of the lower groove in the initial position. By varying the rotation speed of the outer ring of the rotary speed interference box the speed with which a segment of the face cam is traversed by the cam follower roller may be adjusted such that also in this situation no unacceptable cycle time have to be accepted.

By using the principle of separately influencing the rotary speed of one of the discs of the combination of rotor disc and face cam, a great degree of flexibility is obtained with many possibilities of adaptation.

Figures 5A, 5B:
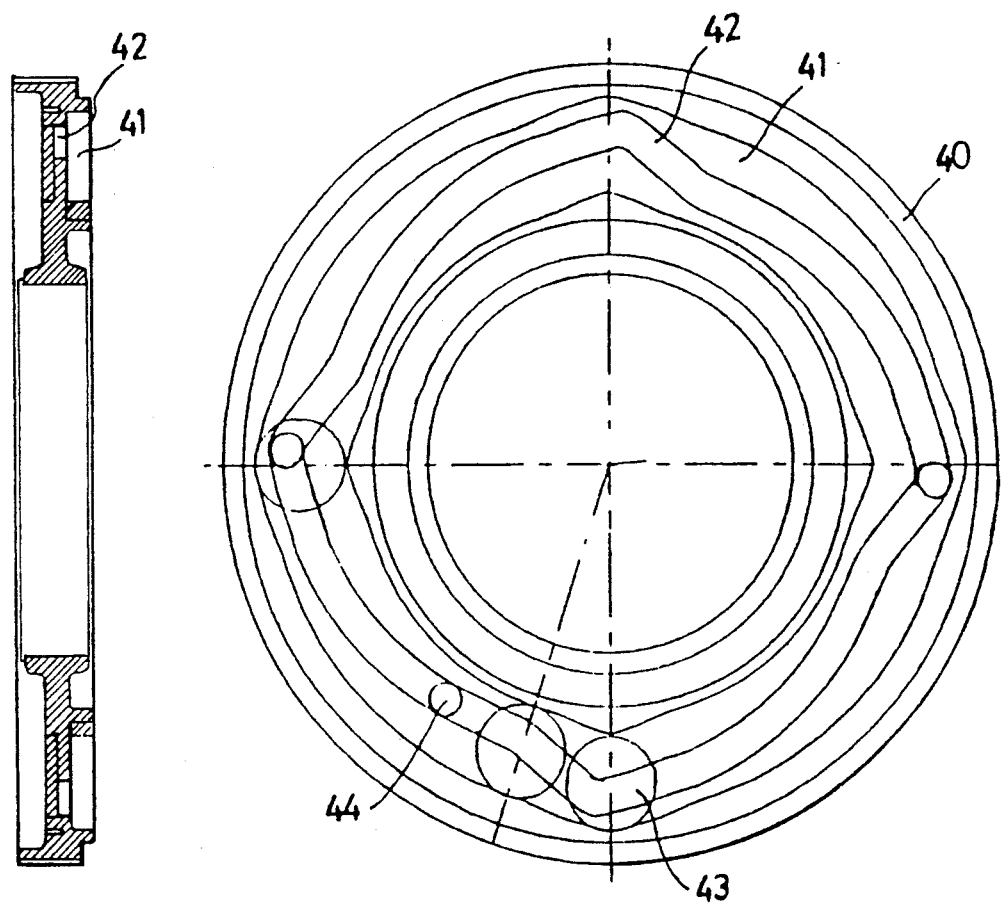
FIGS. 5A and 5B show a view and section of a face cam according to the prior art.

FIGS. 5A and 5B shows a face cam 40 which is suitable for use in an apparatus according to the prior art; however, as indicated earlier, such a disc can be used in the apparatus according to the present invention. A wide groove 41 and a narrow, deeply arranged groove 42 are shown. The cam-follower rollers running in the grooves are indicated diagrammatically by 43 and 44. The cam-follower rollers 42 and 43 are components of a composite cam-follower roller; the cam-follower roller 44 is therefore always inside the circumference of the cam-follower roller 43. The four parts shown, which adjoin one another, of the groove are identical; a complete passage through such a groove part by the composite cam-follower roller will provide a complete operation cycle of deforming rollers and/or cutting devices.

In an apparatus for in-line cropping and chamfering of a tube of plastic a face-cam according to FIGS. 5A and 5B will be used with four cutting devices whereby on either side (in axial direction) of each cutting device a deforming roller is present. The four assemblies of cutting device and deforming rollers are distributed symmetrically around the circumference of a tube at the same axial position thereof.

Figures 6A, 6B:
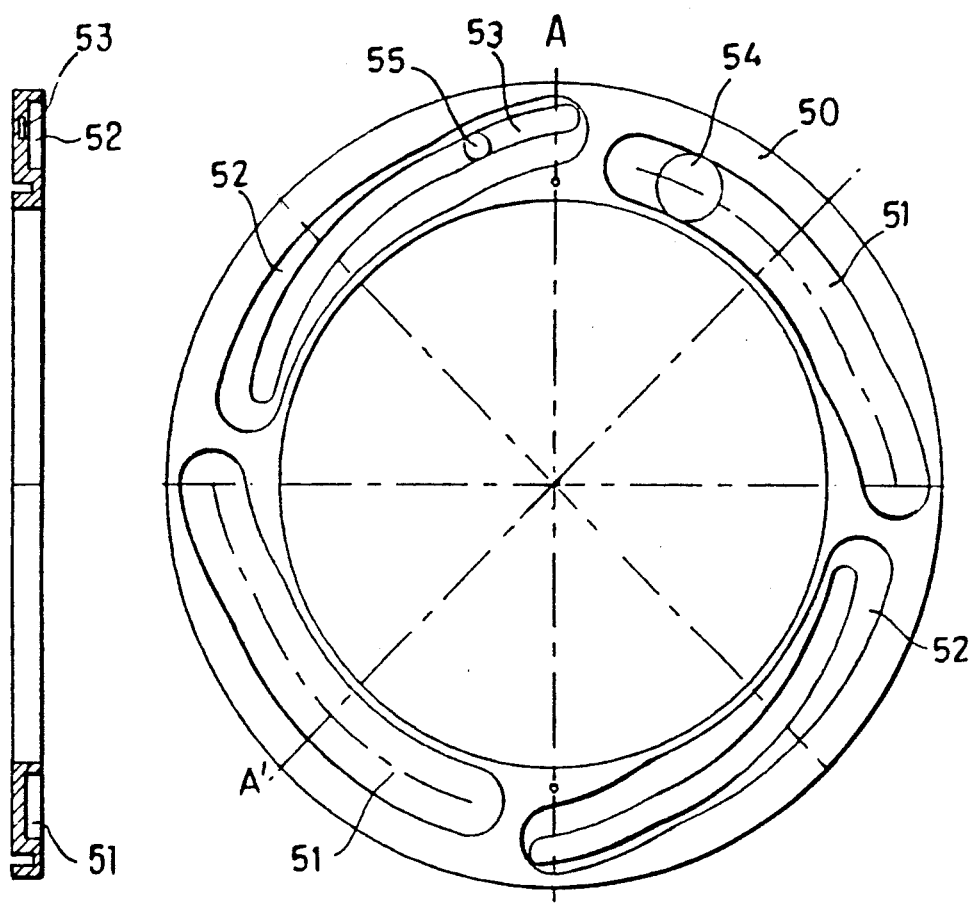
FIGS. 6A and 6B show a view and cross section of a face cam in a particular embodiment and which can be used advantageously in an apparatus according to the present invention.

FIGS. 6A and 6B shows a face cam such as can be used advantageously in an apparatus according to the present invention. Four segments which are in this case identical in pairs can be seen. The segments 51 contain one groove for controlling the movement of the deforming rollers. The segments 52 contain two grooves for controlling the movement of the deforming rollers and the cutting devices. The cam-follower rollers used are indicated diagrammatically by 54 and 55. The cross section has been taken along the line A—A'.

Also a face-cam as in FIGS. 6A and 6B may be used to control the movements of four assemblies having each a cutting device and two deforming rollers.

What is claimed is:

1. Apparatus for in-line cropping and chamfering operations using at least one cutting device, of a plastic tube moulded by extrusion, which apparatus is adapted to be sited in an extrusion line for the continuous moulding of said plastic tube, said apparatus comprising means for positioning a tube section with respect to said at least one cutting device, at least one deforming roller associated with each cutting device on either side thereof for deforming the tube section on which the cropping and chamfering operations are to be carried out, and a rotatable combination of a coaxially mounted rotor disc and a face cam, said face cam having a groove comprised of a plurality of levels and said rotor disc having a plurality of cam-follower rollers engaged in the face cam groove levels, wherein movement of the cam-follower rollers in the face cam groove levels controls movement of the deforming rollers and the at least one cutting device in carrying out the cropping and chamfering operations, and wherein the rotor disc and the face cam have the same circumferential dimension, the apparatus further comprising a planetary gear box for varying the rotary speed of one of the rotor disc and the face cam, said planetary gear box having the capacity to match the rotary speed of said rotor disc and said face cam to each other.

2. Apparatus according to claim 1, in which said planetary gear box acts on the rotary speed of the face cam.

3. Apparatus according to claim 1, in which the face cam groove is subdivided into a number of identical separate groove segments.

4. Apparatus according to claim 2, in which the face cam groove is subdivided into a number of identical separate groove segments.

5. Apparatus according to claim 3, in which the number of identical segments equals the number of cutting devices.

6. Apparatus according to claim 1, which further comprises a reset device which in the event of stoppage of the extrusion line or of a section thereof, provides for the return, at least prior to restarting the extrusion line, of said at least one cutting device and the deforming rollers to an initial position.

* * * * *